US012594944B2

(12) United States Patent
Benon

(10) Patent No.: US 12,594,944 B2
(45) Date of Patent: Apr. 7, 2026

(54) METHOD AND SYSTEM FOR VEHICLE DRIVE MODE SELECTION

(71) Applicant: VOLKSWAGEN AKTIENGESELLSCHAFT, Wolfsburg (DE)

(72) Inventor: Maxwell Benon, Mill Valley, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 344 days.

(21) Appl. No.: 17/552,633

(22) Filed: Dec. 16, 2021

(65) Prior Publication Data

US 2023/0192110 A1     Jun. 22, 2023

(51) Int. Cl.
*B60W 50/08* (2020.01)
*B60K 35/10* (2024.01)
*B60K 35/23* (2024.01)
*B60K 35/25* (2024.01)
*B60K 35/28* (2024.01)
*B60K 35/60* (2024.01)
*B60W 50/14* (2020.01)
(Continued)

(52) U.S. Cl.
CPC ........... *B60W 50/082* (2013.01); *B60K 35/10* (2024.01); *B60K 35/25* (2024.01); *B60K 35/28* (2024.01); *B60K 35/60* (2024.01); *B60W 50/14* (2013.01); *B60W 60/0053* (2020.02); *B62D 1/046* (2013.01); *B60K 35/23* (2024.01); *B60K 2360/172* (2024.01); *B60W 2050/146* (2013.01); *B60W 2422/50* (2013.01)

(58) Field of Classification Search
CPC ............... B60W 50/082; B60W 50/14; B60W 60/0053; B60W 2050/146; B60W 2422/50; B60K 35/00; B60K 35/23; B60K 35/28; B60K 2360/172; B60K 2360/162; B60K 2360/168; B60K 2360/175; B60K 2360/782; B60K 35/25; B60K 35/60; B60K 2360/128; B60K 35/10; B62D 1/046
USPC .......................................................... 701/36
See application file for complete search history.

(56) References Cited

U.S. PATENT DOCUMENTS 5,335,743 A * 8/1994 Gillbrand .................. B60T 7/08
                                                        200/61.54
9,007,199 B2 * 4/2015 Yamada ................. B60K 35/10
                                                        340/459
(Continued)

FOREIGN PATENT DOCUMENTS

EP        3095635 A2    11/2016
EP        3052360 B1     3/2019
(Continued)

OTHER PUBLICATIONS

European Patent Office, Application No. 22207097.1, Search Report dated Jul. 20, 2023.

*Primary Examiner* — Helal A Algahaim
*Assistant Examiner* — Merritt E Levy
(74) *Attorney, Agent, or Firm* — Shield Intellectual Property PC; Kirk D. Wong

(57)        ABSTRACT

A vehicle drive mode selection system selects a preset drive mode for a vehicle when sensors on the vehicle's steering wheel are triggered. Upon triggering of the sensors on the steering wheel, a drive mode selector of the vehicle is configured to switch a current drive mode of the vehicle to the preset drive mode.

17 Claims, 7 Drawing Sheets

(51) Int. Cl.
 *B60W 60/00*   (2020.01)
 *B62D 1/04*    (2006.01)

(56)    References Cited

U.S. PATENT DOCUMENTS

| | | | | |
|---|---|---|---|---|
| 9,738,220 | B2 | 8/2017 | Borghi | |
| 9,896,070 | B2 | 2/2018 | Rosenbaum | |
| 10,585,433 | B2 * | 3/2020 | Melgar | B60W 10/10 |
| 2003/0023353 | A1 * | 1/2003 | Badarneh | B60K 35/10 |
| | | | | 701/1 |
| 2003/0034954 | A1 * | 2/2003 | Sakamaki | G01C 21/36 |
| | | | | 345/156 |
| 2005/0046279 | A1 * | 3/2005 | Dunn | B60Q 1/0082 |
| | | | | 307/10.8 |
| 2007/0247420 | A1 * | 10/2007 | Strohband | H01H 13/84 |
| | | | | 345/156 |
| 2007/0255462 | A1 * | 11/2007 | Masuda | F02D 11/105 |
| | | | | 701/1 |
| 2011/0246028 | A1 * | 10/2011 | Lisseman | B60K 28/066 |
| | | | | 701/45 |
| 2015/0032334 | A1 * | 1/2015 | Jang | B60W 10/20 |
| | | | | 701/42 |
| 2015/0120124 | A1 * | 4/2015 | Bartels | B60W 60/0053 |
| | | | | 701/23 |
| 2015/0123947 | A1 * | 5/2015 | Jubner | G06F 3/0488 |
| | | | | 345/175 |
| 2015/0344059 | A1 * | 12/2015 | Kim | B60Q 1/1484 |
| | | | | 345/184 |
| 2016/0185356 | A1 | 6/2016 | Di Censo et al. | |
| 2016/0185387 | A1 * | 6/2016 | Kuoch | B60K 35/50 |
| | | | | 701/41 |
| 2017/0080948 | A1 * | 3/2017 | Lubbers | B60W 50/14 |
| 2017/0130829 | A1 * | 5/2017 | Aselage | F16H 61/22 |
| 2018/0105184 | A1 * | 4/2018 | Urano | B60K 31/0008 |
| 2018/0208212 | A1 * | 7/2018 | Suessenguth | B60K 35/60 |
| 2019/0202494 | A1 * | 7/2019 | Itou | B62D 15/025 |
| 2019/0210586 | A1 * | 7/2019 | Aizawa | B60W 60/0053 |
| 2020/0062278 | A1 * | 2/2020 | Kuenzner | B60W 50/14 |
| 2020/0339175 | A1 * | 10/2020 | Kandler | B62D 1/065 |
| 2022/0048552 | A1 * | 2/2022 | Salter | B62D 1/06 |

FOREIGN PATENT DOCUMENTS

| | | | | |
|---|---|---|---|---|
| JP | | 2021160631 A | * 10/2021 | |
| WO | | 2013169281 A1 | 11/2013 | |
| WO | WO-2014085277 A1 * | 6/2014 | | B60K 35/00 |
| WO | WO-2015041864 A1 * | 3/2015 | | B60K 37/06 |
| WO | WO-2018175101 A1 * | 9/2018 | | A61B 5/0261 |

* cited by examiner

Normal Mode 20

Sport Mode 22

Eco Mode 24

Comfort Mode 26

Custom Mode 28

Determine when steering wheel pressure sensors are engaged 100

Determine current drive mode 102

Is the current drive mode different from a preset drive mode? 104

No

Yes

Configure vehicle systems to drive in the preset drive mode 106

Activate the preset drive mode 108

Has the preset drive mode been deactivated? 110

No

Yes

Restore previous drive mode or default drive mode 112

METHOD AND SYSTEM FOR VEHICLE DRIVE MODE SELECTION

CROSS-REFERENCE TO RELATED APPLICATIONS

None.

FIELD

The present disclosure relates to methods, apparatuses, and systems for a vehicle and, more particularly, to selecting a drive mode for a vehicle based on receiving user input on sensors disposed on a steering wheel of the vehicle.

BACKGROUND

A transportation vehicle is a highly sophisticated machine with an advanced driving assistance system (ADAS) for perception, navigation, traction control, lane assist, lane centering, lane changing, adaptive cruise control, emergency braking, and/or autonomous driving, a four-wheel drive system, and/or other systems to improve safety and/or comfort. Such vehicles can also have preset drive modes for configuring vehicle components, including ADAS function- ality, engine, transmission, suspension system, steering sys- tem, and braking system. The drive modes allow for adjust- ment of the overall handling, dynamics, functionality, and efficiency of the vehicle. Typically, modes can be set depending on a current usage or desired usage of the vehicle.

FIG. 1 illustrates a driver-side interior of a vehicle. A vehicle interior has multiple human-to-machine interfaces (HMIs) to control the vehicle, including a steering wheel 2, a touch-sensitive display 4, a gear shifter 6, a drive mode knob 8, and other HMI buttons, switches, levers, pedals, sensors, etc. A driver of the vehicle and/or the ADAS can apply a rotational force on the steering wheel 2 to direct the orientation of wheels of the vehicle. Furthermore, a drive mode of the vehicle can be selected by scrolling through the various drive modes using the drive mode knob 8.

FIG. 2 illustrates a drive mode knob for switching and selecting drive modes of a vehicle. The drive mode knob 8 can be rotated clockwise and/or counterclockwise to scroll through a menu on the touch-sensitive display 4. Upon reaching a desired drive mode, the drive mode knob 8 can be left on that mode for selection and/or the drive mode knob 8 can have an input means (e.g., a button, switch, lever, etc.) to select that desired drive mode. The driver can also select one of the displayed drive modes by touching a location for that desired drive mode on the touch-sensitive display 4.

FIG. 3 illustrates a center display of a vehicle displaying a listing of drive modes. The touch-sensitive display 4 can list out one or more of the drive modes 20-28 when the drive mode menu is activated. The drive mode knob 8 can activate said menu and scroll through the menu for selection of a desired drive mode. The drive modes can be displayed on the display 4 one at a time, two at a time, etc. and scrolled through accordingly such that the driver can access the various drive modes.

In an example, the display 4 can list out the following drive modes, including a normal mode 20, a sport mode 22, an eco mode 24, a comfort mode 26, and a custom mode 28. Each drive mode has a preset configuration for the vehicle components to customize handling, dynamics, functionality, and efficiency of the vehicle. The eco mode 24 may con- figure the automotive components to maximize fuel effi- ciency by shutting down various engine cylinders or motors, reducing throttle responsiveness, increasing utilization of batteries in gas-electric hybrid systems, etc. The sport mode 22 may configure the automotive components for maximum handling and acceleration by increasing throttle responsive- ness, stiffening the suspension, lowering the vehicle, acti- vating all engine cylinders or motors, etc.

The drive mode may also include activating or deactivat- ing various levels of automation of a vehicle. The spectrum of drive modes can range from manual driving (i.e., where all ADAS functionality is deactivated), to various assisted states, and up to a fully automated driving state (e.g., SAE level 5 autonomy state) if equipped.

Changing between the many drive modes is a major challenge for the driver. In particular, for automated drive modes, there can be no room for error between zero ADAS functionality and some functionality, e.g., SAE level 2 functions. Such drive modes must be clearly communicated to the driver, so that the driver can adjust his/her level of attention to operate the vehicle.

In addition, there needs to be a more user-experience friendly manner to change drive modes other than by going through a complicated process to manually scroll through a knob or touch-sensitive display HMI. For instance, if a driver wants to unlock a more aggressive acceleration drive mode for entering a highway or overtaking traffic, then there needs an efficient and use friendly manner for the user to quickly switch from a normal drive mode to a sport mode.

BRIEF DESCRIPTION OF THE FIGURES

The present disclosure is illustrated by way of example, and not by way of limitation, in the figures of the accom- panying drawings and in which like reference numerals refer to similar elements and in which.

DETAILED DESCRIPTION OF THE EMBODIMENTS

The figures and descriptions provided herein may have been simplified to illustrate aspects that are relevant for a clear understanding of the herein described devices, sys- tems, and methods, while eliminating, for the purpose of clarity, other aspects that may be found in typical devices, systems, and methods. Those of ordinary skill in the art may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 2:
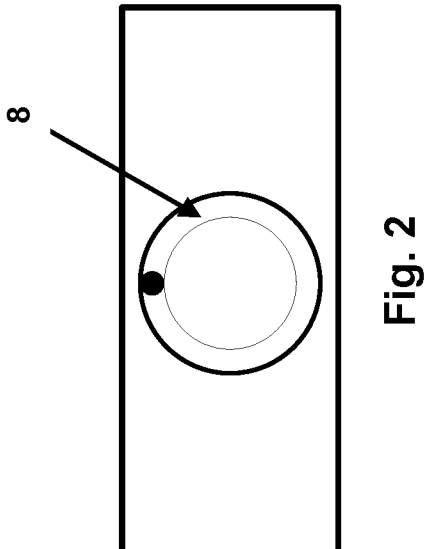
FIG. 2 illustrates a knob for switching drive modes of a vehicle.
Figure 1:
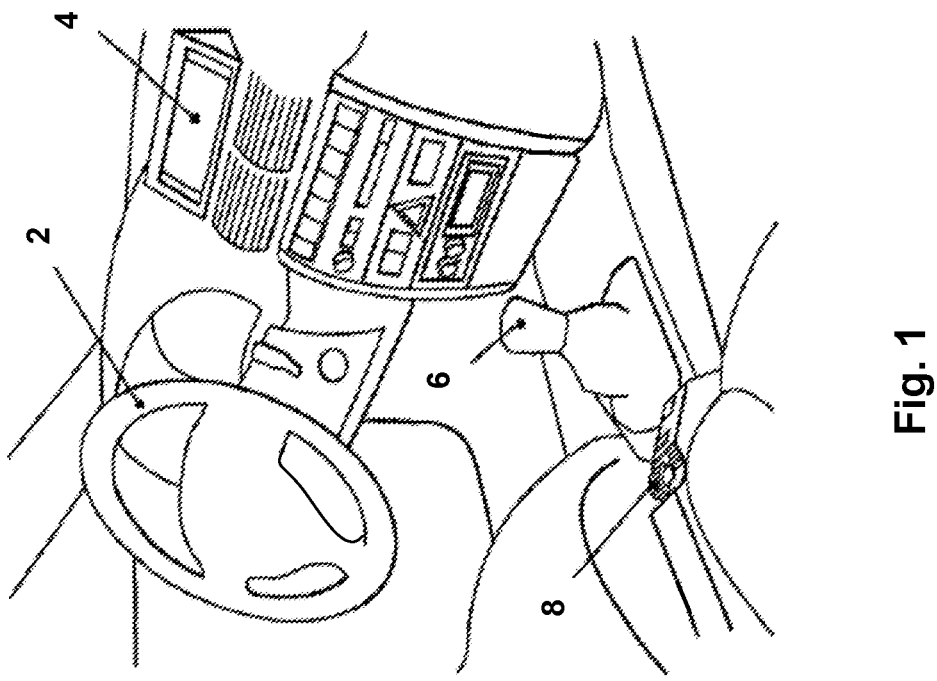
FIG. 1 illustrates a driver-side interior of a vehicle.
Figure 3:
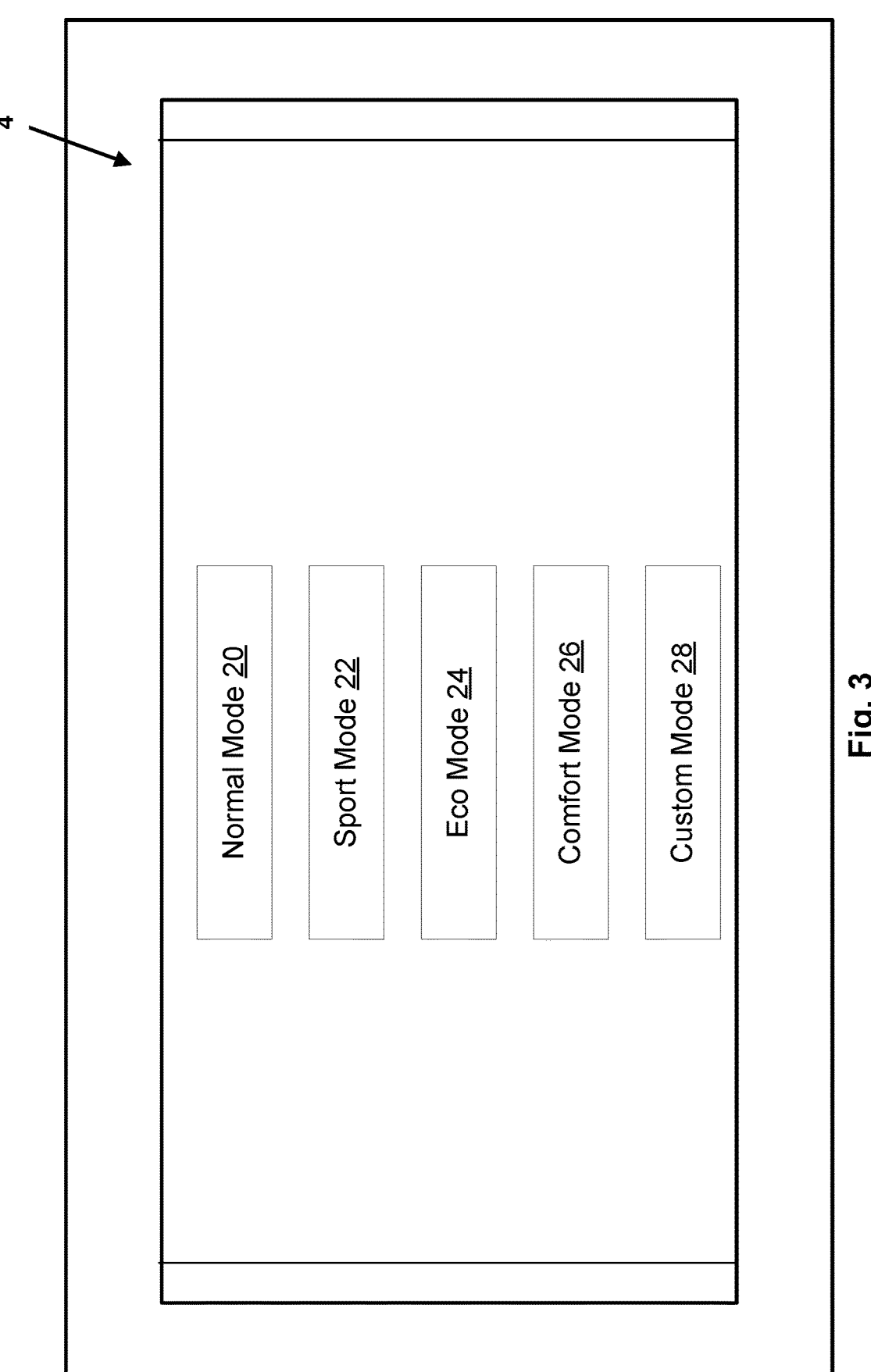
FIG. 3 illustrates a display disposed on a console of a vehicle that displays a listing of drive modes.
Figure 4:
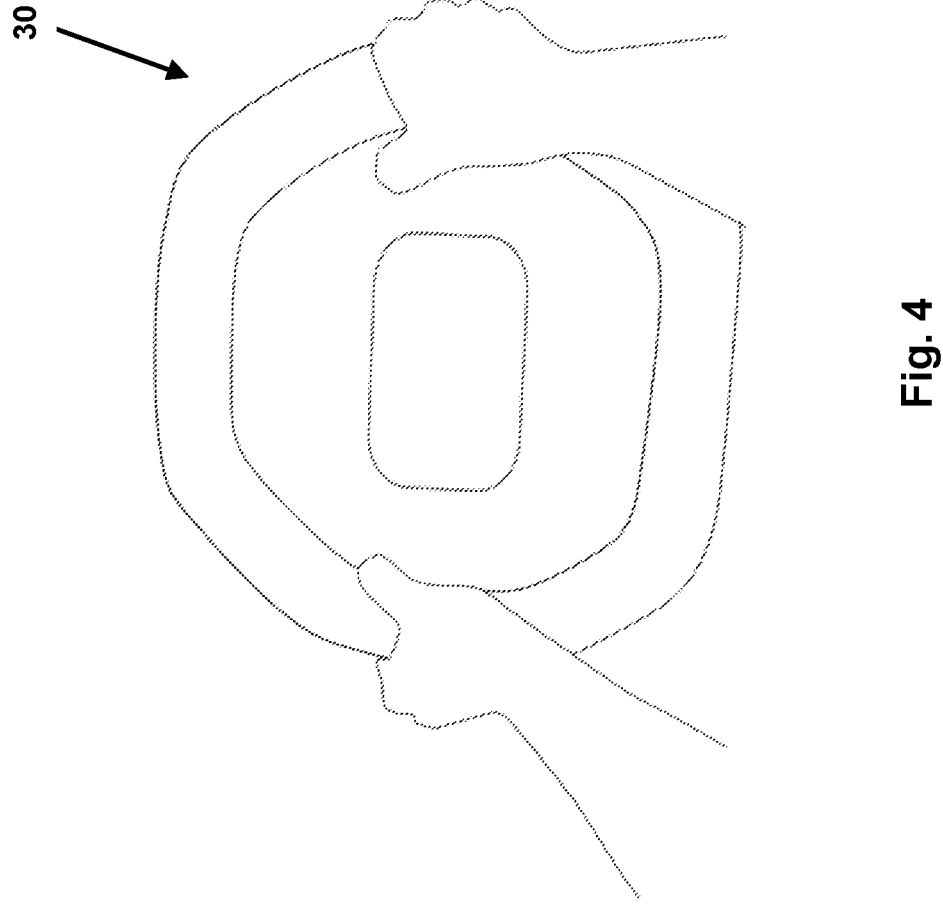
FIG. 4 illustrates a steering wheel of an embodiment of the present disclosure.

FIG. 4 illustrates a steering wheel of an embodiment of the present disclosure. A steering wheel 30 is an interface for drivers to control a path of a moving vehicle. Extensive research has been performed to develop various buttons and knobs on the steering wheel to minimize the amount of distractions on the driver to operate various vehicle functionality. For instance, a driver may increase, decrease, or mute a speaker volume of the vehicle, switch radio stations or sound tracks, make or take phone calls, enable one or more ADAS functionalities, etc. However, such buttons and knobs are not able to indicate any information to the driver of the current drive mode. Rather, the driver must activate a drive mode menu and look through a displayed menu of drive modes to find the current drive mode and to select a desired drive mode.

Figure 5A:
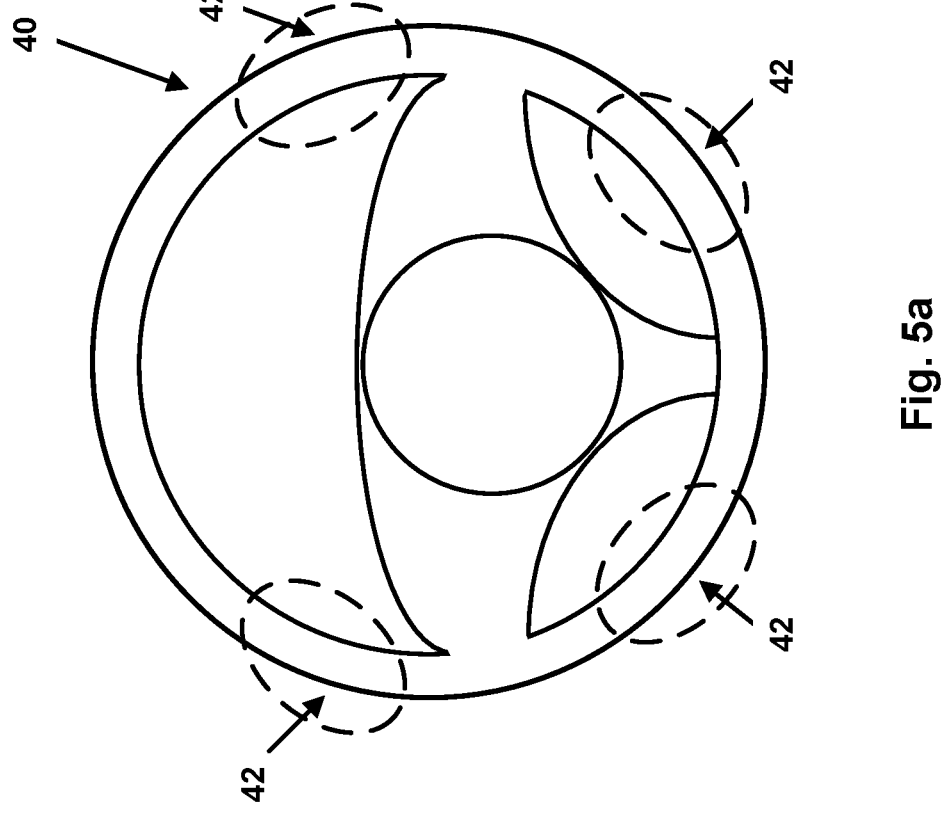
FIG. 5a illustrates a steering wheel of an embodiment of the present disclosure having pressure sensors.

FIG. 5a illustrates a steering wheel of an embodiment of the present disclosure having pressure sensors. In an embodiment of the present disclosure, a steering wheel 40 of a vehicle has multiple pressure sensors around the gripping areas 42 of the steering wheel 40 to measure the amount of pressure applied on one or more of the griping areas 42 (e.g., by the driver squeezing on two of the gripping areas 42).

When pressure is applied at the gripping areas 42 that exceed a threshold pressure value, a preset drive mode is engaged for the vehicle. The threshold pressure value can be predefined by setting a default pressure value. The threshold pressure value can also be user selected from a menu on an HMI of the vehicle and/or by physical driver calibration (e.g., by having the driver squeeze the sensors at the gripping areas 42 to a particular sensed pressure value). Furthermore, the preset drive mode can be predefined as a default and can be changed by a user of the vehicle.

Once the gripping areas 42 are triggered, the preset drive mode can be engaged on the vehicle for a predefined period of time. Alternatively, in an embodiment, the preset drive mode can be applied while the pressure sensors of the steering wheel are actively engaged by the driver. When the pressure sensors are no longer engaged, then the drive mode of the vehicle can revert back to the previous drive mode the vehicle was in or be otherwise disengaged. It can be further appreciated that other triggering events can be used to disengage the preset drive mode.

In an example embodiment, the gripping areas 42 can be located symmetrically about the steering wheel 40 at locations a driver would typically place their hands for operating the vehicle. As a safeguard, the driver may need to simultaneously squeeze the gripping areas 42 at two locations to ensure that both of the driver's hands are being used to control the vehicle in the preset drive mode.

It can be appreciated that the gripping areas 42 can be located at other areas of the steering wheel 40 and may not be symmetrically placed about the wheel. Furthermore, it can be understood that the number of gripping areas that need to squeezed can be set to one gripping area should the driver desire to only use one gripping area to engage the preset drive mode.

The pressure sensors at the gripping areas 42 can be implemented using pressure sensor technologies (e.g., piezoresistive sensors, resistive sensors, capacitive sensors, tactile pressure sensor, load cells, strain gauges, microelectromechanical systems, force-sensitive resistors, etc.) and can be triggered when a preset or otherwise defined pressure value threshold is reached or exceeded. Ideally, the pressure value threshold should be set to a level to avoid false positives when the driver is not intentionally trying to trigger the gripping areas 42. Furthermore, the steering wheel 40 may have a smooth exterior for the driver to easily glide his/her hands to various positions along the steering wheel 40. The pressure sensors at the gripping areas 42 can be leveled with the steering wheel 40 exterior so that the driver can move his/her hands around the steering wheel 40.

In another embodiment of the present disclosure, the pressure sensors may be located right underneath and touching the steering wheel 40 exterior. In another embodiment, the pressure sensors can be recessed (or protruding) from the steering wheel 40 exterior so that the driver can quickly feel the location of the gripping areas 42.

In yet another embodiment of the present disclosure, the steering wheel 40 can have an illuminated outline of the gripping areas 42 to provide a visual target for the driver to locate such gripping areas 42. The illuminated outline can be implemented by having lighting elements (light emitting diodes, "LEDs") disposed along the outer edge of the gripping areas 42 on the steering wheel 40.

In an embodiment of the present disclosure, LEDs can be flush with the steering wheel and outline the gripping areas. The LEDs may emit a plurality of colors to further assist in conveying information to the driver. The LEDs may omit white, red or green colored light. When the gripping areas 42 are not being gripped by the drive, a white outline of the gripping can be shown by the LEDs. When one or more of the gripping areas 42 are held, the color of the LEDs corresponding to an outline of those one or more gripping areas 42 can change its displayed color to red. When the one or more gripping areas 42 are triggered by the requisite pressure, the red displayed color turn to green to alert the driver of the activation of the preset drive mode. It can be appreciated that other colors and other permutations can be contemplated based on the present disclosure. The above configuration is an illustrative example to aid in the understanding of the present disclosure and is not meant to limit the disclosure in any way.

In an embodiment of the present disclosure, a current drive mode of a vehicle is set to a normal mode. Upon triggering of the steering wheel pressure sensors (i.e., squeezing one or more of the gripping areas 42), the drive mode of the vehicle is switched to a sport mode which is activated. The sport mode can be the preset drive mode for the vehicle. The sport mode is activated as long as the steering wheel sensors stay engaged by the driver (i.e., the driver maintains squeezing the gripping areas 42 to keep the sport mode activated).

In sport mode, the vehicle may increase throttle responsiveness, increase the steering responsiveness, adjust the suspension system by stiffening the suspension and lowering the vehicle relative, and configure other components of the vehicle for better driving performance relative to normal mode. When the driver releases the pressure on the gripping areas 42 (i.e., the sensed pressure value on the pressure sensors falls below the pressure value threshold), the drive mode is deactivated and the vehicle activates the normal mode.

In another embodiment of the present disclosure, a normal drive mode of a vehicle can be set to a SAE Level 2 automation having lane assist and adaptive cruise control functionality. Upon triggering of the steering wheel pressure sensors, the drive mode of the vehicle is switched to a manual drive mode where all ADAS functionality is deactivated (i.e., SAE Level 0). The manual drive mode can be engaged while the steering wheel sensors are engaged. When the driver releases the pressure on the gripping areas of the steering wheel, the drive mode is switched back to the normal drive mode having SAE Level 2 functionality.

In yet another embodiment of the present disclosure, an ADAS normal mode can be engaged for a vehicle, where an adaptive cruise control (ACC) system is activated. When a driver activates a sport mode by squeezing the steering wheel at the gripping areas, the vehicle can enter into a sport mode in which the vehicle performance is maximized and the ACC system is temporarily deactivated while the driver is squeezing the steering wheel at the gripping areas.

It can be appreciated that pressure sensors at the gripping areas for determining whether a driver is squeezing the gripping areas are illustrative examples of a type of sensor to determine whether the driver is triggering the activating of the preset drive mode. For instance in an embodiment the gripping areas 42 may have other types of sensors located on the steering wheel to determine whether the driver is squeezing the gripping areas 42. For instance, said sensors may be capacitive proximity sensors capable of determining amount of surface area is being touched by a user on the sensors. If the sensed area is greater in value than a predefined area value, then the sensors can be triggered for activation of the preset drive mode.

In another embodiment, the sensors at the gripping areas 42 can work in conjunction with in-cabin camera/image sensor(s) to determine an attention value for the driver. For instance, the camera/image sensor(s) can track the head movement, facial expression, and/or gaze of the driver to calculate an attention value representing the level of attention the driver is providing for operating the vehicle. If the attention value of the driver does not meet a predefined value for properly operating the vehicle, the vehicle is configured to deactivate the preset drive mode of the vehicle from being activated by squeezing the gripping areas 42. When attention value of the driver meets the predefined value for properly operating the vehicle, then the vehicle can be configured to allow for activation of the preset drive mode of the vehicle via the triggering of the gripping areas 42 as disclosed herein.

Figure 5C:
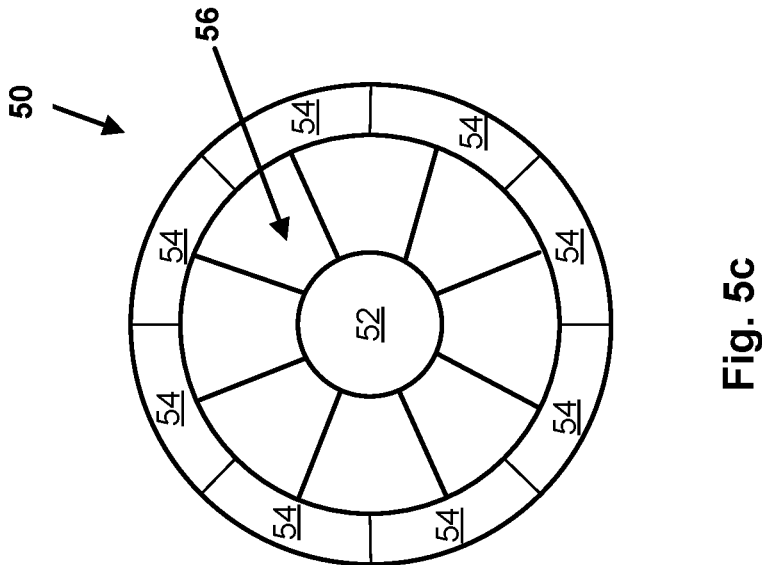
FIG. 5c illustrates a cross-sectional view of a gripping area of a steering wheel of an embodiment of the present disclosure.
Figure 5B:
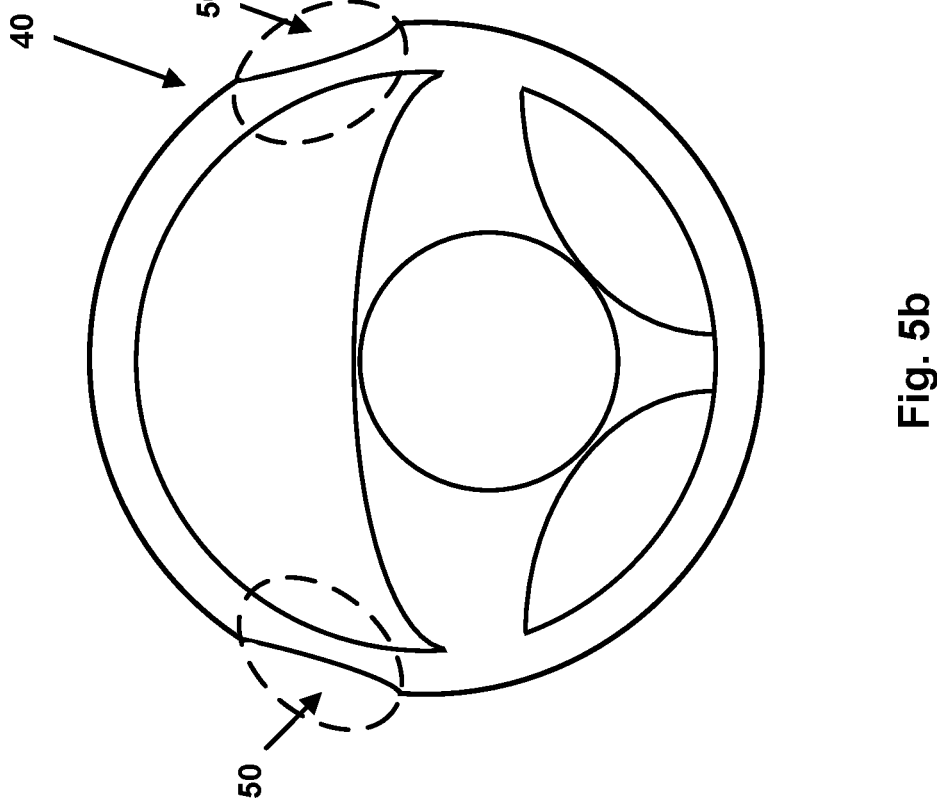
FIG. 5b illustrates a steering wheel of an embodiment of the present disclosure, where the gripping areas of the steering wheel are compressed.

FIG. 5b illustrates a steering wheel of an embodiment of the present disclosure, where the gripping areas of the steering wheel are compressed when the preset driving mode is activated. In an embodiment of the present disclosure, when pressure sensors on the gripping areas 50 of the steering wheel 40 are triggered (i.e., squeezed by the driver), the gripping areas 50 are compressed, which may provide a tactile indication to the driver that the preset drive mode is engaged. The compressed gripping areas 50 can stay compressed for the duration of the engagement of the preset drive mode. When the preset drive mode is disengaged, the compressed gripping areas 50 are restored to their original position along the steering wheel 40. The restored or original position of the gripping areas 50 can be flush with steering wheel 40 exterior.

FIG. 5c illustrates a cross-sectional view of a gripping area of a steering wheel of an embodiment of the present disclosure. In a cross-sectional view of one of the gripping areas 50, the steering wheel has pressure sensors 54 disposed around the circumference of the steering wheel 40, compressible elements 56, and a core 52. The compressible elements 56 are disposed between and coupled to the pressure sensors 54 and the core 52. The pressure sensors 54 and compressible elements 56 are communicatively coupled to a controller of the vehicle, where the controller can receive data from the pressure sensors 54 and the elements 56 and operate compression states of the compressible elements 56. Wiring (not shown) can be embedded in the steering wheel 50 and routed through a steering column of the vehicle to the controller (also not shown).

The compressible elements 56 can be implemented by foam, spring loaded latch, compressed-air-actuated elements, compression limiters, compression spring, compression mechanism, rubber, gel, etc. The steering wheel 40 can be compressed when pressure is applied on the pressure sensors 54 and elements 56. The core 52 can be a plastic, metal, and/or composite material, where the core is secured to the steering column of the vehicle. Upon applying pressure to the pressure sensors 54 (i.e., squeezing the gripping areas 50 by the driver), the elements 56 become compressed under said pressure. The elements 56 can include a locking mechanism (latch, spring, air actuated element, etc.) to keep the elements 56 in a compressed orientation. When the preset drive mode is disengaged, the controller can signal to the elements 56 to return to their original orientation to restore the steering wheel 40 to its original shape.

Figure 6:
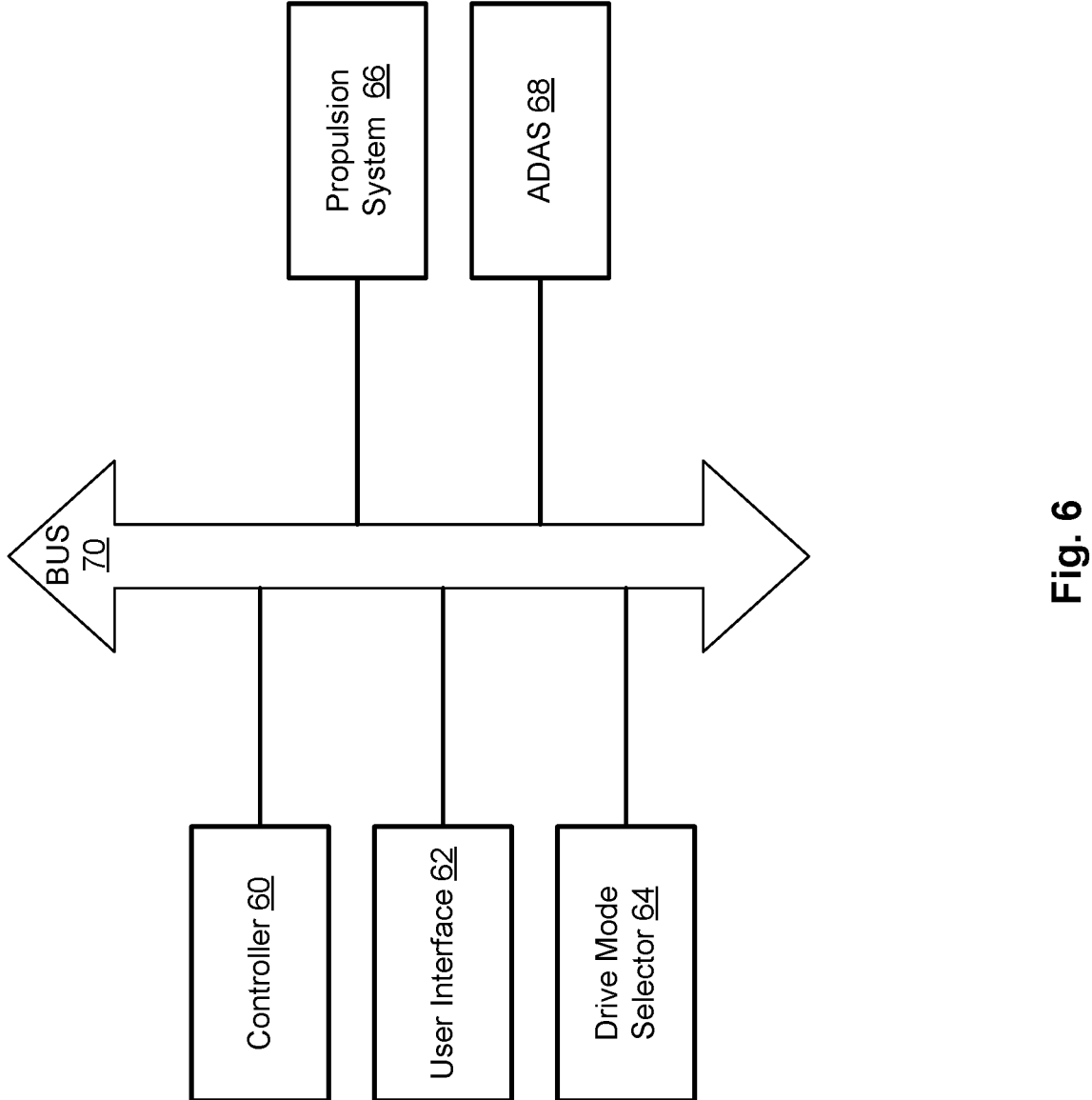
FIG. 6 illustrates a block diagram of vehicle components of an embodiment of the present disclosure.

FIG. 6 illustrates a block diagram of vehicle components of an embodiment of the present disclosure. In an embodiment of the present disclosure, a vehicle comprises a controller 60, a user interface 62, a drive mode selector 64, a propulsion system 66, ADAS 68, and a bus system 70, where the bus system communicatively couples the various components 60-68. The user interface 62 includes various HMIs, including a steering wheel having compressible gripping areas and pressure sensors. The controller 60 can receive data from the pressure sensors of the steering wheel to control the drive mode selector 64. Upon triggering of the pressure sensors, the drive mode selector 64 can switch the current drive mode of the vehicle to the preset drive mode. When the preset drive mode is activated, the drive mode selector 64 configures the propulsion system 66 and ADAS 68 in accordance with the preset drive mode. The preset drive mode can be engaged for a predefined amount of time or until the preset drive mode is otherwise disengaged as outlined in the present disclosure (e.g., when the user releases his/her grip on the gripping areas of the steering wheel).

In an embodiment when the preset drive mode is engaged, cabin interior lighting can be used as a visual cue to the driver and/or passengers in the vehicle to represent a drive mode change and/or the current drive mode being used. For instance, when a driver activates the sport mode by squeezing the steering wheel gripping areas, the steering wheel and/or cabin light may change colors to provide a visual cue to the driver or passenger of the mode change and may maintain a second color for as long as the sport mode is activated.

In another embodiment of the present disclosure, if the vehicle is in an autonomous drive mode, the steering wheel can be illuminated in green with green cabin lighting to notify the passengers and drivers that the vehicle is in control (partly or fully) of the vehicle. When the driver switches the mode from autonomous mode to a sport mode in which the driver is in manual control of the vehicle, the steering wheel color and the cabin color can turn to a different color, e.g., green, red or yellow, of such operation of the vehicle.

Additionally, a visual indicator can be provided on a dashboard, head up display (HUD), etc. of the vehicle to indicate the current drive mode to the driver. Also, an auditory indicator can also be provided with a message or tone to indicate that the drive mode was changed.

To aid in the understanding of the present disclosure, controller 60 and drive mode selector are shown as two distinct modules. However, this is merely an example and not meant to be limiting since it can be appreciated that the drive mode selector 64 and the controller 60 can be implemented by a single computing device or split into multiple modules.

It can be further appreciated that the present disclosure can be implemented with all of the modules described herein, less than all of the modules described herein, or with additional modules known in the state of the art in conjunction with the modules described herein. The instant figures are not meant to limit the disclosure in any way and are only instructive of the many embodiment of the present disclosure.

Figure 7:
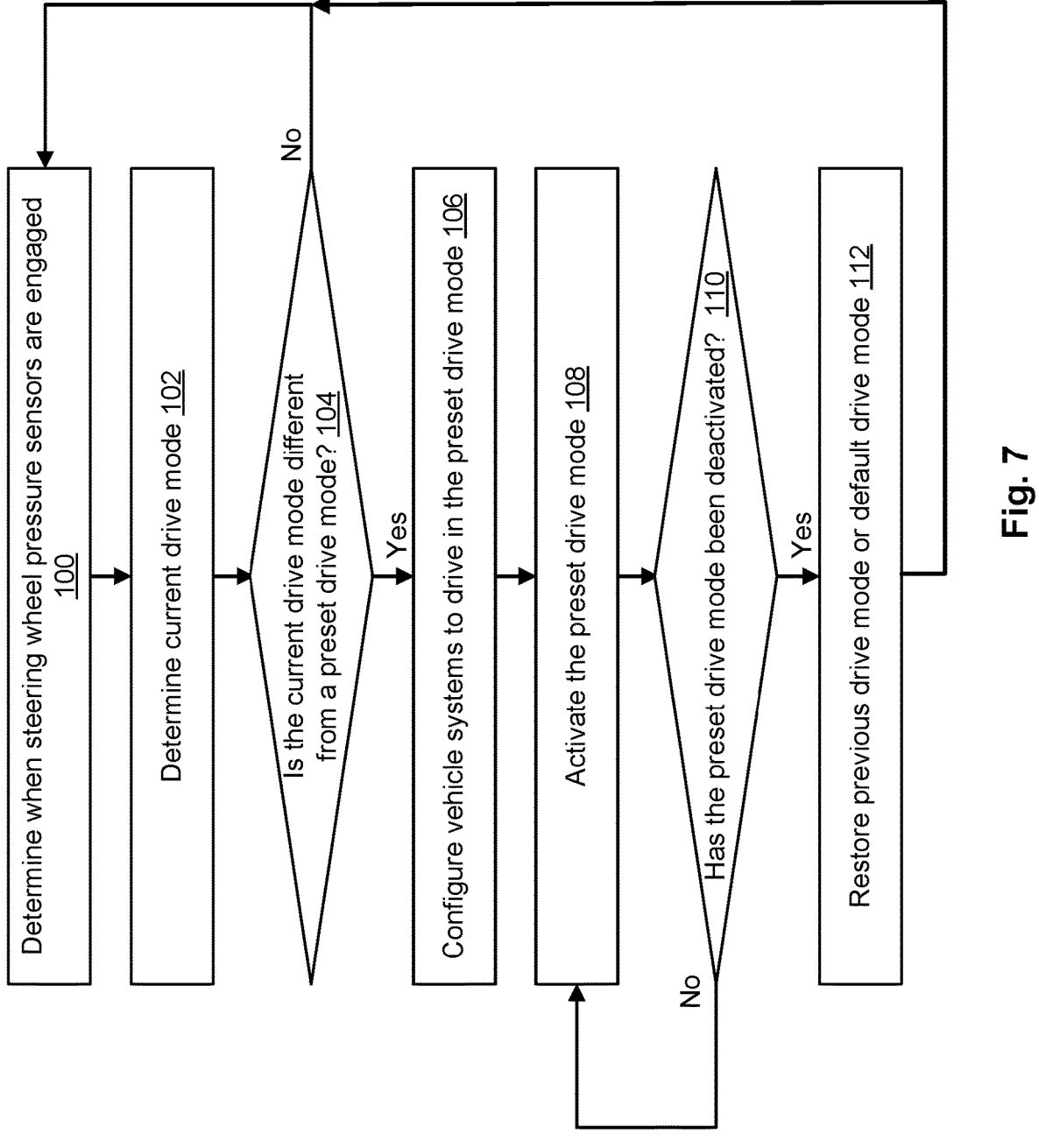
FIG. 7 illustrates a flow chart for a method of an embodi- ment of the present disclosure to engage a preset drive mode by activating pressure sensors on a steering wheel of the vehicle.

FIG. 7 illustrates a flow chart for a method of an embodiment of the present disclosure to engage a preset drive mode by activating pressure sensors on a steering wheel of the vehicle. In an embodiment of the present disclosure, a method for activating a preset drive mode can be initiated by determining when pressure sensors on the steering wheel are engaged 100. Next, the current drive mode of the vehicle is determined 102. The current drive mode is compared with the preset drive mode to determine if they are different 104. If not, pressure sensors are monitored for engagement 100.

If so, the vehicle is configured to drive in the preset drive mode 106. Once activated, the vehicle is operated using the preset drive mode 108. The preset drive mode is activated until a triggering event deactivates the preset drive mode 110. If the preset drive mode is engaged, then continue on driving in the preset drive mode. If the preset drive mode is disengaged, then return the drive mode to the previous drive mode before activation of the preset drive mode (or other drive mode, e.g., a default drive mode) 112. Once the previous drive mode is restored, then the system can monitor the pressure sensors for a next activation 100.

The approaches described herein are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising." "including." and "having." are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on". "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A vehicle drive mode selection system, comprising:
a steering wheel having a plurality of gripping areas disposed along a circumference of the steering wheel over a core;
a plurality of sensors disposed at the gripping areas;
a plurality of compressible elements, wherein the compressible elements are disposed between the core and the plurality of sensors;
a drive mode selector for configuring a propulsion system of a vehicle to a first drive mode among a plurality of drive modes;

a controller communicatively coupled to the steering wheel, the plurality of sensors, the compressible elements, the propulsion system, and the drive mode selector, the controller configured to determine whether one or more sensors of the plurality of sensors are triggered, and upon a determination that the one or more of sensors are triggered beyond a threshold pressure level, the controller further configured to:

cause the drive mode selector to switch from the first drive mode to a second drive mode among the plurality of drive modes, the drive mode selector causes the propulsion system to operate in accordance with the second drive mode while the one or more sensors remain triggered;

upon the determination that the one or more sensors are triggered, cause one or more compressible elements, of the plurality of compressible elements, disposed under the one or more sensors to collapse;

upon a determination that a sensor among the one or more sensors is no longer triggered, cause the drive mode selector to switch from the second drive mode back to the first drive mode, the drive mode selector causes the propulsion system to operate in accordance with the first drive mode; and restore the collapsed one or more compressible elements to an original orientation when the second drive mode is disengaged.

2. The system of claim 1, wherein the controller is communicatively coupled to an advanced driver-assistance system (ADAS), where the controller is configured to cause the ADAS to operate in accordance with the second drive mode.

3. The system of claim 2, wherein the ADAS is configured to deactivate one or more functions of the ADAS during activation of the second drive mode.

4. The system of claim 2, wherein the ADAS is configured to deactivate an autonomous driving function during activation of the second drive mode.

5. The system of claim 1, wherein the controller is configured to receive data from the plurality of sensors and sense the triggering of the one or more sensors when at least one of the one or more sensors senses the threshold pressure value.

6. The system of claim 1, wherein lighting elements are disposed around the gripping areas.

7. The system of claim 6, wherein the lighting elements emit a plurality of colored light, and wherein upon the triggering of the one or more sensors, a light indicative of the second drive mode is emitted by the lighting elements.

8. The system of claim 1, wherein the plurality of sensors are flush with the exterior of the steering wheel.

9. The system of claim 1, wherein the plurality of sensors are recessed from the exterior of the steering wheel.

10. The system of claim 1, wherein the plurality of sensors are protruded from the exterior of the steering wheel.

11. The system of claim 1, further comprising a head-up-display (HUD), wherein upon the triggering of the one or more sensors, the HUD is configured to display a message to indicate that the second drive mode is activated.

12. The system of claim 1, wherein the controller is configured to determine when the one or more sensors are triggered when sensors among the plurality of sensors at two of the gripping areas sense pressure above a threshold pressure value.

13. The system of claim 1, wherein the second drive mode is a sport mode among the plurality of drive modes.

14. A vehicle drive mode selection method, comprising:

determining that one or more pressure sensors among a plurality of pressure sensors disposed along a circumference of a steering wheel of a vehicle are engaged beyond a threshold pressure level;

determining a current first drive mode for the vehicle;

configuring systems of the vehicle to switch from driving in the first drive mode to driving in a second drive mode in response to the determination that the one or more pressure sensors are engaged when the first drive mode is different from the second drive mode, wherein one or more compressible elements disposed under the one or more pressure sensors are configured to collapse;

activating the second drive mode for operating the vehicle;

upon determining that a pressure sensor among the one or more pressure sensors is no longer engaged:

configuring systems of the vehicle to switch from driving in the second drive mode back to driving in the first drive mode;

activating the first drive mode for operating the vehicle; and configuring the one or more compressible elements to be restored to an original orientation upon determining that the second drive mode is disengaged.

15. The vehicle drive mode selection method of claim 14, wherein the systems include an advanced driver-assistance system (ADAS).

16. The vehicle drive mode selection method of claim 15, wherein the ADAS is configured to deactivate an autonomous driving function during activation of the second drive mode.

17. The vehicle drive mode selection method of claim 14, wherein the second drive mode is a sport mode.

\* \* \* \* \*